(12) United States Patent
Lim

(10) Patent No.: US 8,200,299 B2
(45) Date of Patent: Jun. 12, 2012

(54) PORTABLE TERMINAL

(75) Inventor: Hyun-Su Lim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 410 days.

(21) Appl. No.: 12/474,986

(22) Filed: May 29, 2009

(65) Prior Publication Data

US 2009/0312076 A1    Dec. 17, 2009

(30) Foreign Application Priority Data

Jun. 12, 2008 (KR) .................. 10-2008-0055078

(51) Int. Cl.
*H04M 1/00* (2006.01)
(52) U.S. Cl. .................. 455/575.4; 379/433.12
(58) Field of Classification Search .... 455/575.1–575.4; 379/433.01, 433.11, 433.12
See application file for complete search history.

(56) References Cited

U.S. PATENT DOCUMENTS

| | | | | |
|---|---|---|---|---|
| 5,978,215 | A * | 11/1999 | Chiu et al. | 361/679.11 |
| 7,120,458 | B2 * | 10/2006 | Wendorff et al. | 455/550.1 |
| 7,292,882 | B2 * | 11/2007 | Lee et al. | 455/575.4 |
| 7,450,979 | B2 * | 11/2008 | Seo | 455/575.4 |
| 2005/0054393 | A1 * | 3/2005 | Fagerstrom et al. | 455/575.1 |
| 2005/0107119 | A1 | 5/2005 | Lee et al. | |
| 2006/0154515 | A1 | 7/2006 | Seo | |
| 2006/0240881 | A1 * | 10/2006 | Cho et al. | 455/575.4 |
| 2007/0037618 | A1 * | 2/2007 | Lee | 455/575.4 |
| 2007/0123322 | A1 | 5/2007 | Mizushina | |
| 2009/0156263 | A1 * | 6/2009 | Park et al. | 455/566 |
| 2009/0298562 | A1 * | 12/2009 | Lim | 455/575.4 |

FOREIGN PATENT DOCUMENTS

| | | |
|---|---|---|
| CN | 1913538 | 2/2007 |
| JP | 2007-179525 | 7/2007 |
| KR | 1020010063190 | 7/2001 |
| KR | 1020050123247 | 12/2005 |
| KR | 1020070018396 | 2/2007 |

* cited by examiner

*Primary Examiner* — Christian Hannon
(74) *Attorney, Agent, or Firm* — The Farrell Law Firm, P.C.

(57) ABSTRACT

Disclosed is a portable terminal that includes a main housing; a first sliding housing slidably installed on the main housing in such a manner that the first sliding housing slides in a first direction; second sliding housings slidably installed on the main housing in such a manner that the second sliding housings slide in a second direction; and a sliding module for providing driving force allowing the first and second sliding housings to move, the sliding module being installed on the main housing, wherein the first sliding housing and second sliding housings simultaneously move from each position where they overlap the main housing to each position where they extend from on the main housing.

15 Claims, 7 Drawing Sheets

PORTABLE TERMINAL

PRIORITY

This application claims priority to an application entitled "Portable Terminal" filed in the Korean Industrial Property Office on Jun. 12, 2008 and assigned Ser. No. 10-2008-55078, the contents of which are hereby incorporated by reference.

BACKGROUND OF THE INVENTION

1. Field of the Invention

The present invention relates to a portable terminal, and in particular, to a portable terminal allowing a user to conveniently perform various functions, such as a portable Internet function, a multimedia function, e.g. watching motion pictures, gaming functions, etc., as well as voice call and short text message transmission, through the portable terminal.

2. Description of the Related Art

When mobile communication services through a portable terminal began to be commercialized, only services in the range limited to voice calls or short message transmissions had been provided. However, as the reception/transmission speed of wireless communication and the degree of integration of terminal circuit devices have been improved, the range of such mobile communication services has increased to include emailing and motion picture file transmission, etc. It has recently become possible for users to enjoy Internet service, which had previously only been provided through a personal computer, through a portable terminal.

Such portable terminals may be classified into a bar-type terminal having multiple input/output devices, such as a keypad, a display device, a transmitter, a receiver, etc., installed in one single housing thereof, a folder-type or a sliding-type housing terminal having input/output devices properly distributed and arranged on a pair of housings thereof, etc. according to the external appearance of the portable terminals.

The folder-type terminal has a pair of housings foldably connected with each other through a hinge device. A user can fold the folder-type housing to make it into a small size while carrying it, and can unfold the folder-type housing while using it so as to easily perform voice call or operate a keypad of the housing.

The sliding-type terminal can have a pair of housings, which are installed in such a manner that they can move linearly respective to each other so that the housings can be opened through linear movement to allow the user to use a keypad thereof. Also, there is an advantage in that a display device is always kept in an open state so that the user can check the operational state of the terminal, message reception information, etc., according to the user's desire while conveniently carrying the terminal.

As such, as mobile communications service has been diversified, and the user can conveniently carry and use portable terminals because the size and the weight of the terminals has decreased. The use of a portable terminal has become widespread.

As the use of a portable terminal has been generalized, demands from users about portable terminals, such as demand for diversification of the design of the portable terminal and demand for a high level of a multimedia functionality thereof, has increased. However, the external appearance of the portable terminal is limited to the appearances of bar-type terminals, folder-type terminals, sliding-type terminals, etc. Therefore, it is difficult to diversify the design and the function of the portable terminal.

SUMMARY OF THE INVENTION

Accordingly, the present invention has been made to solve at least the above-mentioned problems occurring in the prior art, and the present invention is provided to contribute to the diversification of the design of the portable terminals.

Also, the present invention provides a portable terminal, which allows a user to conveniently open/close the portable terminal.

Also, the present invention provides a portable terminal, which allows a user to conveniently carry the portable terminal and has a plurality of housings foldably assembled therewith so that the user can conveniently use the portable terminal after unfolding the housings.

In accordance with an aspect of the present invention, there is provided a portable terminal that includes a main housing; a first sliding housing slidably installed on the main housing in such a manner that the first sliding housing slides in a first direction; second sliding housings slidably installed on the main housing in such a manner that the second sliding housings slide in a second direction; and a sliding module for providing driving force to move the first and second sliding housings, the sliding module being installed on the main housing, wherein the first sliding housing and second sliding housings simultaneously move from positions where they are overlapped on the main housing to positions where they are extended from the main housing.

The first and second directions may be set perpendicular to each other.

The second sliding housings may move on the main housing in such a manner that they approach or move away from each other, and when they move away from each other, they are drawn from both sides of the main housing, respectively.

The sliding module may include a disc rotatably installed on the main housing, a first link, which has one end pivotably connected with the disc and another end pivotably connected with the first sliding housing, and a second link, which has one end pivotably connected with the disc and another end pivotably connected with one of the second sliding housings.

A pair of second sliding housings is installed on the main housing, and respective second sliding housings are connected with the disc through one of the second links.

The first and second sliding housings may be connected with each other through the disc and the first and second links. As one of the first and second sliding housings slides, the disc is rotated by the first or second link connected with the sliding housing, and the first and second sliding housings slide according to the rotation of the disc.

As the first sliding housing slides, the disc is rotated by the first link connected with the first sliding housing, and the second sliding housings approach or move away from each other according to the rotation of the disc.

The sliding module may further include a fixed plate mounted on the main housing, and the disc may be rotatably installed on the fixed plate.

The sliding module may further include an elastic member having one end supported by the disc and another end supported by the fixed plate, thereby providing a driving force to slide the first and second sliding housings. The elastic member may provide an elastic force applied in a direction where both ends of the elastic member move away from each other, and a point where both ends of the elastic member approach each other to the maximum degree is positioned between a point where the first and second sliding housings are overlapped on the main housing and a point where they are extended from the main housing.

The elastic member may generate a driving force, which moves the first and second sliding housings to the point where they are overlapped on the main housing, within an interval between the point where both ends of the elastic member approach each other to a maximum degree and the point where the first and second sliding housings are overlapped on the main housing, and also generates a driving force, which slides the first and second sliding housings to slide in a direction where they are extended from the main housing, within an interval between the point where both ends of the elastic member approach each other to a maximum degree and the point where the first and second sliding housings have been extended from the main housing.

The portable terminal may further include a reception recess formed on one surface of the main housing, wherein the reception recess may be opened toward both sides of the main housing when the fixed plate is seated on the main housing.

The pair of second sliding housings may be seated on the reception recess, and the sliding housings may be inserted into or extended from both sides of the main housing, respectively, through sliding movement on the main housing.

The portable terminal may further include each guide rail formed on inner walls of an upper and a lower sides of the reception recess and each guide groove formed on both end walls of the second sliding housings, wherein each guide rail is engaged with each corresponding guide groove so as to allow the second sliding housings to be slidably assembled with the main housing and guides movement of the second sliding housings.

A part of one surface of the fixed plate may be opened according to sliding of the first sliding housing, and a first keypad may be installed on the open part of the fixed plate.

The portable terminal may further include second keypads installed on the second sliding housings, respectively, wherein, when the first and second sliding housings are extended from the main housing, a keypad having qwerty keypad arrangement is formed by the first keypad and the second keypads.

In order to slidably install the first sliding housing on the main housing, the portable terminal may include guide slots formed on a rear surface of the first sliding housing in such a manner that they extend along the first direction and guide ribs formed on one surface of the fixed plate, wherein the guide ribs are assembled with the guide slots so as to allow the first sliding housing to be assembled with the main housing and simultaneously guide the sliding of the first sliding housing.

The portable terminal according to the present invention may include sliding housings, which are extended from an upper side and both sides of the main housing, respectively, so that the portable terminal can provide a keypad having a qwerty arrangement equal to a typical computer keyboard, thereby securing convenience in using the keyboard. Also, the user can conveniently carry the portable terminal in a state where the sliding housings are overlapped on the main housing.

The sliding housings may be interlocked with each other through a disc and links, which rotate on the main housing, so that the user can conveniently open/close the portable terminal.

If a display device using a touch screen is installed on a surface, which is always exposed to the outside regardless of the open/close operation of the sliding housings, it is possible to perform a short voice call, transmit a message, or check a received message without need for drawing the sliding housings from the main housing, thereby securing convenience in using the portable terminal. Also, according to whether the portable terminal is opened or closed, it is possible to implement various operational modes (e.g. voice calls, message sending, searching Internet, watching motion pictures, listening to music, creating a document, etc.). Therefore, the present invention can contribute to the diversification of the portable terminal.

In a market for a portable terminal where folder-type terminals and sliding-type terminals, which are opened/closed by using a pair of housings thereof, are the main trend, a portable terminal, which is opened/closed through new type of an opening/closing operation, is provided so that the various tastes and demands of users can be satisfied.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter, an embodiment according to the present invention will be described with reference to the accompanying drawings. In the following description of the present invention, a detailed description of known functions and configurations incorporated herein will be omitted when it may obscure the subject matter of the present invention.

Figure 1:
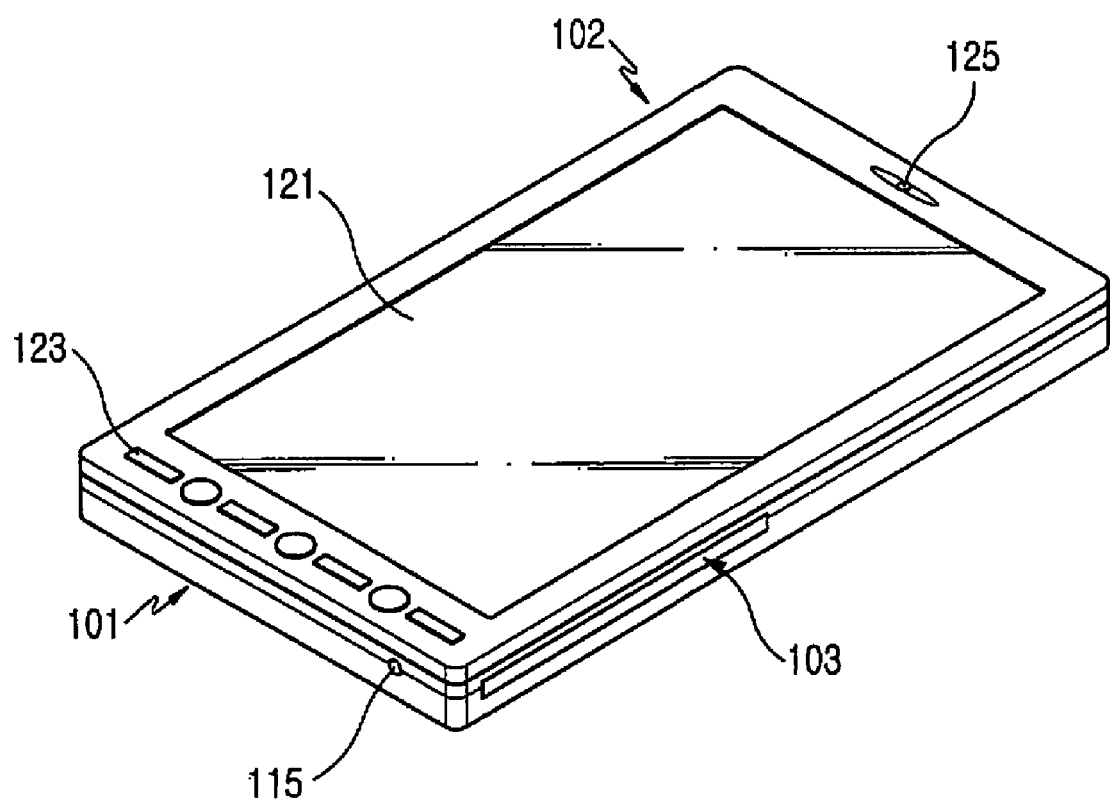
FIG. 1 is a perspective view of a portable terminal according to an embodiment of the present invention.
Figure 2:
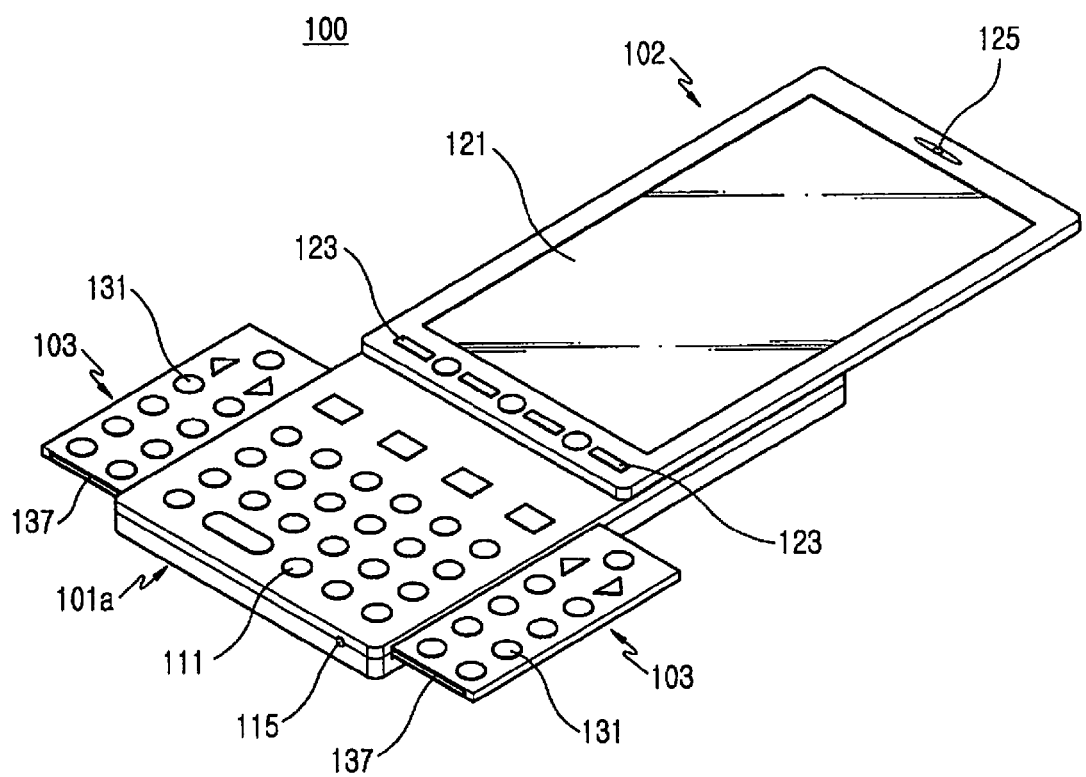
FIG. 2 is a perspective view showing a state where first and second sliding housings of the portable terminal shown in FIG. 1 are extended.
Figure 3:
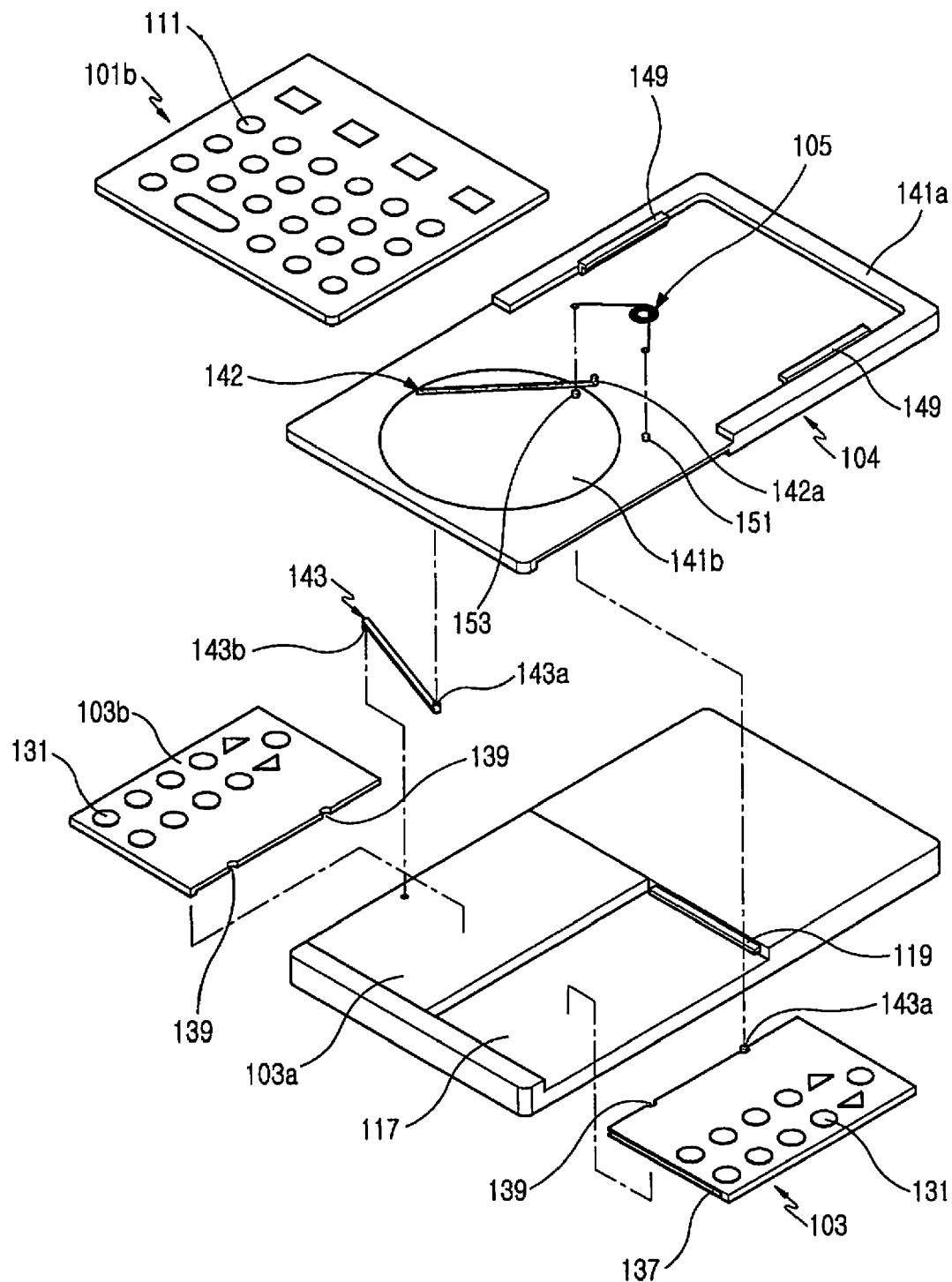
FIG. 3 is an exploded perspective view of the portable terminal shown in FIG. 1.

As shown in FIGS. 1 to 3, a portable terminal 100 according to an embodiment of the present invention includes a main housing 101, a first sliding housing 102, second sliding housings 103, and a sliding module 104. The first and second sliding housings 102 and 103 are interlocked with each other through the sliding module 104. That is, when one of the first and second sliding housings 102 and 103 slides, the remaining sliding housings also slide. It is preferred that, when a user slides the first sliding housing 102, the second sliding housings 103 slide on the main housing 101.

Referring to FIGS. 1 and 2, the first sliding housing 102 is assembled with the main housing 101 in such a manner that faces the main housing, and slides in a first direction, particularly, in the longitudinal direction of the main housing 101.

The main housing 101 includes a first keypad 111 installed on one surface thereof, a transmission part 115 installed on one surface of the lower end of the main housing, and a battery pack (not shown) detachably assembled with a rear surface of the main housing. As described below, a fixed plate 141a, which is a part of the sliding module 104, is mounted on the main housing 101, and the first keypad 111 is installed on the fixed plate 141a. That is, the fixed plate 141a may be a part of the main housing 101 and also may be a part of the sliding module 104.

Figure 4:
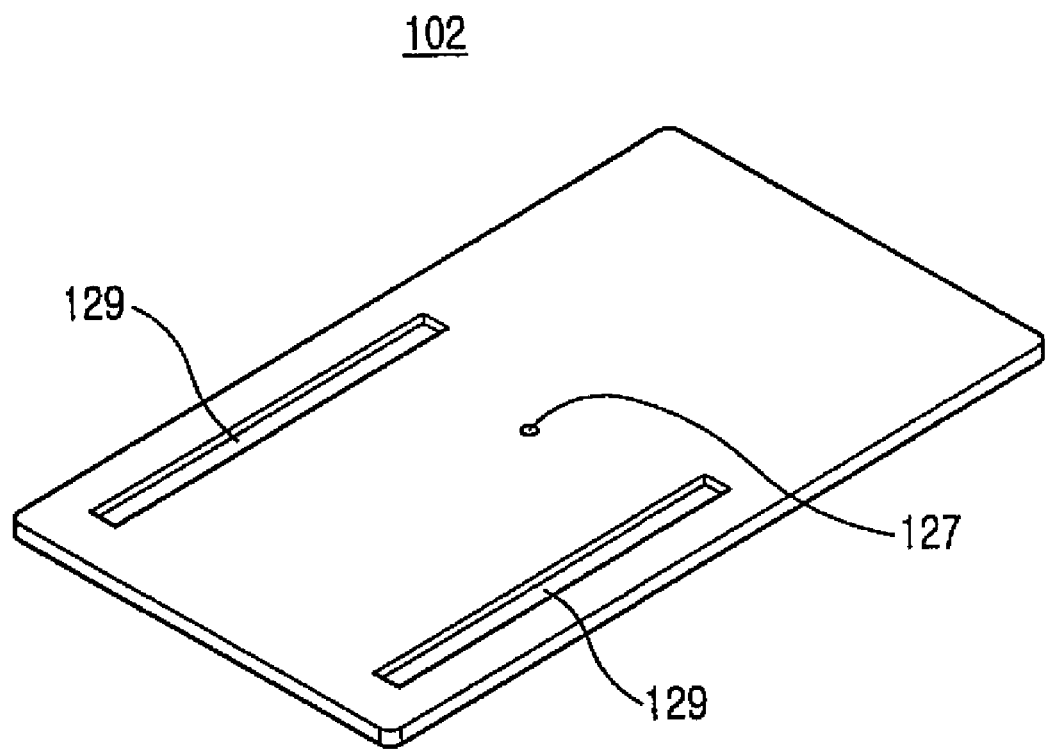
FIG. 4 is a perspective rear view of the first sliding housing of the portable terminal shown in FIG. 1.

The first sliding housing 102 includes a display device 121 installed on a front surface thereof, a functional keypad 123, and a reception part 125. Referring to FIG. 4, guide slots 129 and a first link hole 127 are formed on the rear surface of the first sliding housing 102. The guide slots 129 are formed on a lower part of the rear surface of the first sliding housing 102 in such a manner that each guide slot nears each edge of both sides of the first sliding housing 102. Each guide slot 129 extends along a longitudinal direction of the main housing 101 and can guide the movement of the first sliding housing 101. The first link hole 127 is adjacent to a lower end part of the first sliding housing 102 and is positioned between the guide slots 129.

The display device 121 may be formed by using a touch screen and may function as an input device even though the first sliding housing 102 is overlapped with the main housing 101. Therefore, the user can search for telephone numbers through a telephone directory and input the searched telephone numbers to the portable terminal through a key input apparatus implemented through the display apparatus 121, thereby performing a voice call and making short text message, etc.

The pair of second sliding housings 103 is installed on the main housing 101. The second housings 103 are inserted into or extended from the sides of the main housing 101 in such a manner that each second housing slides in a second direction. That is, the second direction is a direction perpendicular to the first direction. As a result, the first sliding housing 102 slides in a longitudinal direction of the main housing 101, and the second sliding housings 103 move in a transverse direction of the main housing 101 according to the sliding of the first sliding housing 102.

The second sliding housings 103 each include second keypads 131, and when the second sliding housings 103 are extended from the sides of the main housing 101, the second key pads 131 together with the first keypad 111 can form a keypad having a qwerty keypad arrangement equal to that of a keypad of a typical computer.

As shown in FIG. 1, in a state where the first and second sliding housings 102 and 103 are overlapped on the main housing 101, the user cannot access to keypads of the second sliding housings 103. In order to extend the first and second sliding housings 102 and 103 from the main housing, the user moves the first sliding housing 102 upward on the main housing 101.

When the first sliding housing 102 moves up or down, the second sliding housings 103 are interlocked with the first sliding housing 102 through the sliding module 104 and move in a direction where the sliding housings move away from each other or approach each other.

In the detailed description of an embodiment of the present invention, 'a sliding module' refers to components, which allow the first and second sliding housings 102 and 103 to be slidably assembled with the main housing 101 and also interconnect the first and second sliding housings 102 and 103 with each other. That is, the term 'sliding module' is a term introduced to simplify its description and does not require a specific component. The term 'sliding module' refers to a component, which connects the main housing 101, the first sliding housing 102, and the second sliding housings 103 with each other, and a structure where they are connected with each other.

Hereinafter, a structure where the first and second sliding housings 102 and 103 are assembled with the main housing 101 will be described below with reference to FIG. 3.

The sliding module 104 includes a disc 141b rotatably installed on the main housing 101, a first link 142 that has one end pivotably connected with the disk 141b and the other end pivotably connected with the first sliding housing 102, and second links 143. One end of each second link 143 is pivotably connected with the disk 141b and the other end thereof is pivotably connected with one of the second housings 103. The first link 142 has a link protuberance 142a formed at one end thereof, and the second link 143 has link protuberances 143a and 143b formed on both ends thereof, respectively. The first and second links 142 and 143 are pivotably assembled with the first and second sliding housings 102 and 103. The link protuberance 142a of the first link 142 is assembled with the first link hole 127 formed on the first sliding housing 102. A link protuberance is also formed at the other end of the first link, but not shown in the drawings. The first sliding housing 102 is arranged in such a manner that the first sliding housing 102 faces one surface of the disc 141b, and the second sliding housings 103 are arranged in such a manner that the second sliding housing 103 face the other surface of the disc 141b. Therefore one end of the first link 142 is connected with the one surface of the disc 141b and each end of the second links 143 is connected with the other surface of the disc 141b.

One end of the first link 142 is pivotably connected with the disc 141b and the other end thereof is pivotably connected with the first sliding housing 102. The disc 141b rotates according to the sliding of the first sliding housing 102, and the first sliding housing 102 moves according to the rotation of the disc 141b. Similarly, the second sliding housings 103 are connected with the disc 141b through the second links 143, respectively. Therefore, the sliding of the second sliding housings 103 and the rotation of the disc 141b are performed simultaneously.

When the first sliding housing 102 slides, the disc 141b is rotated by the first link 142, and the second sliding housings 103 are slid simultaneously by the second links 143.

The sliding module 104 may include an elastic member 105 for providing driving force to the rotation of the disc 141b. The elastic member 105 provides elastic force applied in the direction where both ends of the elastic member 105 move away from each other. In one embodiment, a torsion coil spring having a coil and free ends extending in a direction where the free ends move away from the coil is disclosed as the elastic member, and the torsion coil spring provides elastic force applied in the direction where the free ends move away from each other.

One end of the elastic member 105 is supported by the disc 141b, and the other end thereof is supported by the fixed plate 141a. Both ends of the elastic member 105 approach or move away from each other according to rotation of the disc 141b. At this time, a point where both ends of the elastic member 105 approach each other to the maximum degree is positioned between a point where the first and second sliding housings 102 and 103 are overlapped on the main housing 102 and a point where they are extended from the main housing 102. That is, the point where both ends of the elastic member 105 approach each other to the maximum degree is positioned within a section where the first and second sliding housings 102 and 103 slide. The elastic member 105 provides driving force to the first and second sliding housings 102 and 103 to slide to the point where they are overlapped on the main housing 101 or the point where they are extended from the main housing 101. This operation will be described in more detail with reference to FIGS. 5 to 7.

The sliding module 104 may include the fixed plate 141a fixed on the main housing 101. The fixed plate 141a rotatably supports the disc 141b, and simultaneously allows the first sliding housing 102 to be slidably assembled with the main housing 101.

The fixed plate 141a includes a pair of guide ribs 149, which extend along one surface thereof in such a manner that the guide ribs face each other. The guide ribs 149 extend to the inner side of the first sliding housing 102 through guide slots 129 formed on the first sliding housing 102. The guide ribs each have a bent upper end so that they allow the first sliding housing 102 and the fixed plate 141a to be assembled with each other. The first sliding housing 102 is assembled with the main housing 101 through the fixed plate 141a, particularly through the guide ribs 149, and is also guided by the guide ribs 149 to slide in the first direction.

Support pins 151 and 153 are formed on the fixed plate 141a and the disc 141b, respectively, so as to support the elastic member 105. Both ends of the elastic member 105 (the free ends in a case of the torsion coil spring) are supported by one of the supporting pins 151 and 153. When the disc 141b rotates, the supporting pin 151 formed on the disc 141b approaches or moves away from the supporting pin 151 formed the fixed plate 141a so that the both ends of the elastic member 105 approach or move away from each other.

A part of the fixed plate 141a is opened when the main housing 101 slides, and the first keypad plate 101b is mounted on the open part of the fixed plate 141a. The first keypad 111 is installed on the first keypad plate 101b. As a result, the first keypad 111 is opened according to the sliding of the first sliding housing 102, and the disc 141b, the first link 142, and the elastic member 105 are protected without exposure to the outside.

In order to install the second sliding housings 103, a reception recess 117 is formed on the lower part of the main housing 101. The reception recess 117 is closed by the fixed plate 141a, and both side ends thereof are opened toward the side ends of the main housing 101. The second sliding housings 103 are received in the reception recess 117 and slide in a direction where they approach each other or in a direction where they move away from each other. When the second sliding housings 103 move away from each other, the second sliding housings 103 move toward the side ends of the main housing, respectively.

Each guide rail 119 is formed on the inner walls of the upper and lower walls of the reception groove 117, and each guide groove 137 is formed on the walls of the upper and lower ends of each second sliding housing 103. When the second sliding housing 103 is received on the reception recess 117, each guide rail 119 is engaged with each corresponding guide groove 137 so that the guide rail 119 allows the second sliding housings 103 to be assembled with the main housing 101 and guides the movement of the second sliding housings 103.

Each second sliding housing 103 includes a sliding pad 103a sliding on the main housing 101 and a second keypad plate 103b. The other end of each second link 143 is pivotably connected with the sliding pad 103a and is disposed between the sliding pad 103a and the second keypad plate 103b. Even though the second sliding housing 103 is extended from the main housing 101, the second link 143 is protected without exposure to the outside.

Each first link protuberance 143a of the link protuberances 143a and 143b, which are formed on one end of each second links 143, protrudes out of an upper surface of the second keypad plate 103b to be connected with the disc 141b. Avoidance grooves 139 are formed on the second keypad plate 103b and can selectively accept the first link protuberances 143a. In a state where the second sliding housings 103 are received into the reception grooves 117, each first link protuberance 143a can be stably connected with the disc 141b without interference with the second keypad plate 103b.

Figure 6:
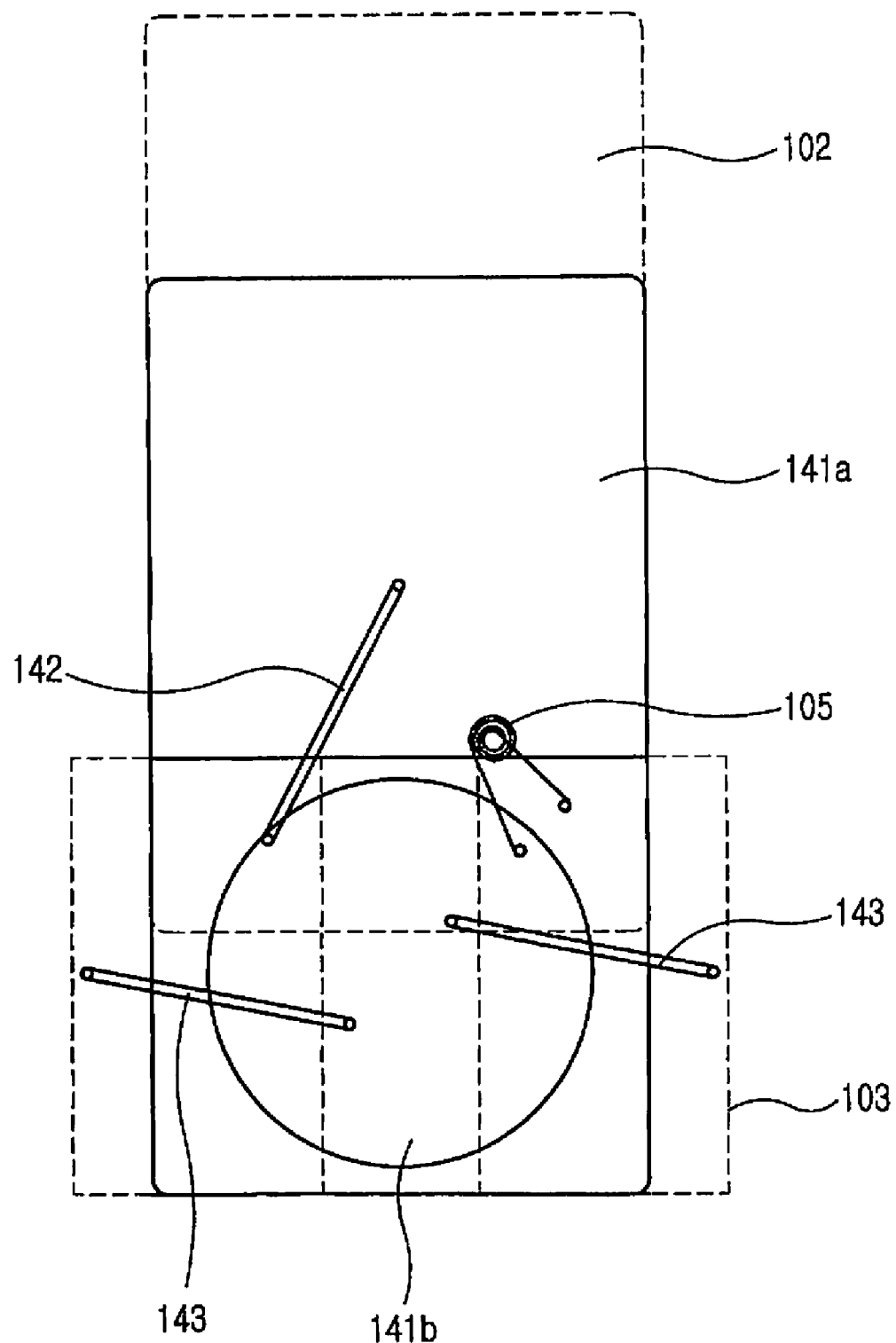
Figure 7:
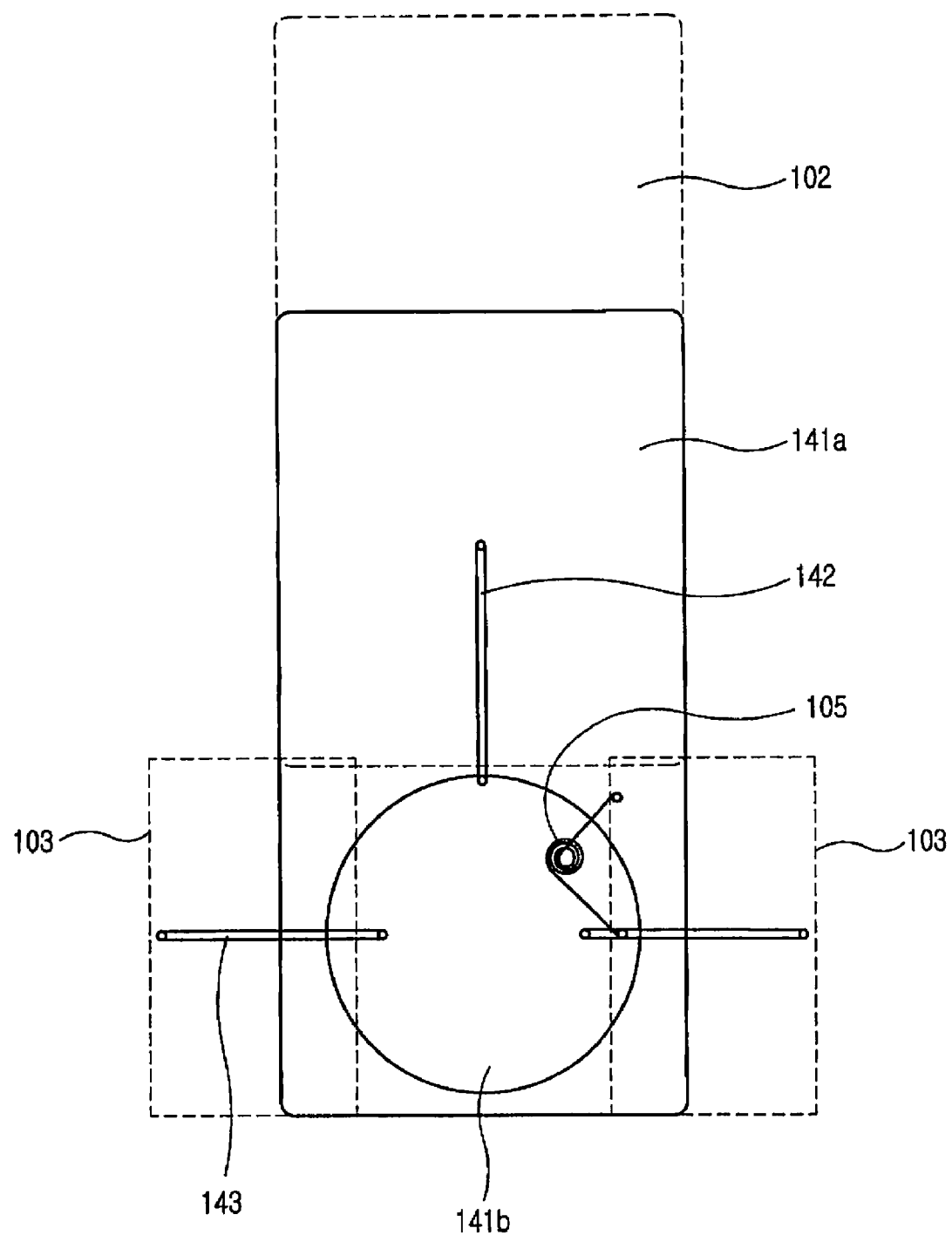

Hereinafter, with reference to FIGS. 5 to 7, the sequential operation where the portable terminal 100 is opened will be described. It is noted that FIGS. 5 to 7 are schematic views showing position relation between the disc 141b, first and second links 142 and 143, etc. according to the operation of the terminal 100.

Figure 5:
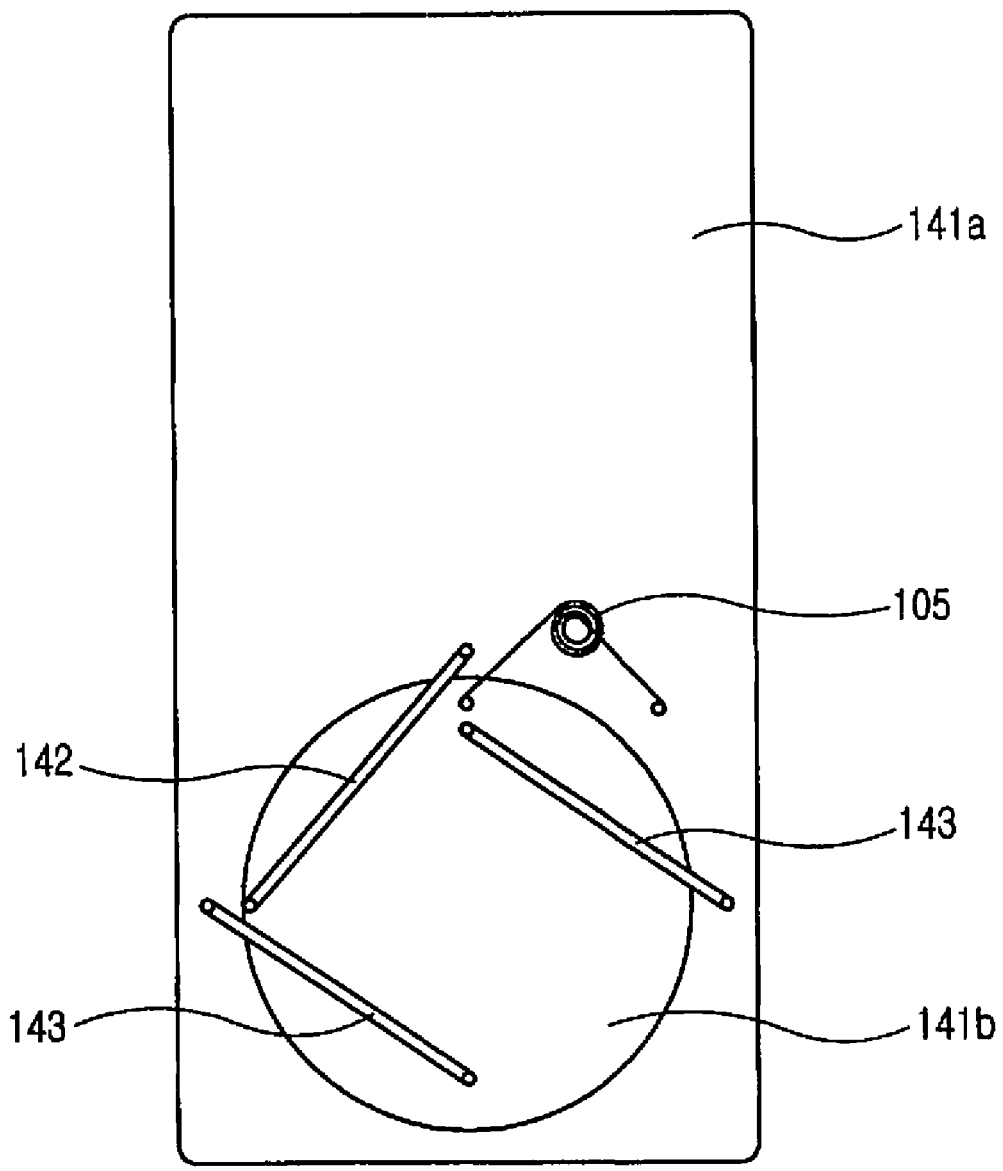
FIGS. 5 to 7 are planar views showing a procedure where the first and second sliding housings of the portable terminal shown in FIG. 1 are sequentially extended.

FIG. 5 shows a state where the first and second sliding housings 102 and 103 are overlapped on the main housing 101 (hereinafter, referred to as 'a first point') as shown in FIG. 1. The elastic member 105 provides an elastic force applied in a direction where both ends of the elastic member 105 moves away from each other, and in this state the disc 141b has the property of rotating in a counterclockwise direction.

Each guide rib 149 interferes with the wall of the upper end of each guide slot 129 so that the first sliding housing 102 can not move downward. Due to elastic force of the elastic member 105, it is possible to maintain a state of the terminal 100 where the first and second sliding housings 102 and 103 are overlapped on the main housing 101.

When the user gradually moves the first sliding housing 102 upward from the first point, one end of the first link 142 gradually moves upward together with the first sliding housing 102, and the disc 141b rotates in a clockwise direction. The second links 143 also allow the second sliding housings 103 to move away from each other, and the second sliding housings 103 are gradually extended from both sides of the main housing 101.

FIG. 6 shows a state where the disc 141b is rotated at 45 degrees based on the point shown in FIG. 5. Half of the first keypad 111 and half of the second keypads 131 are exposed. When the disc 141b rotates at 45 degrees based on the point shown in FIG. 5, both ends of the elastic member 105 are positioned at point where they approach each other to the maximum degree (hereinafter, referred to as 'a second point').

Within an interval between the first point and the second point, the elastic member 105 provides an elastic force to rotate the disc 141b in a counterclockwise direction. Within an interval between the first point and the second point, the first and second sliding housings 102 and 103 are provided with a driving force so that the first and second sliding housings slide in a direction where they overlap on the main housing 101.

When the user further moves the first sliding housing 102 upward so that the first sliding housing 102 passes by the second point, the elastic force of the elastic member 105 is converted to driving a force to rotate the disc 141b in a clockwise direction. If the disc 141b is rotated in the clockwise direction by receiving the driving force from the elastic member 105, the first and second links 142 and 143 move the first and second sliding housings 102 and 103 in each progressing and outward direction.

When the user moves the first sliding housing 102 upward until the first sliding housing passes the second point, the first sliding housing 102 moves to a point where the first sliding housing fully exposes the first keypad 111 and fully exposes the second keypads 131 (hereinafter, referred to as 'a third point') after a time point when the first sliding housing 102 passes the second point. The third point is illustrated in FIG. 7.

Within an interval between the first point to the second point, the user moves the first sliding housing 102 so as to rotate the disc 141b and simultaneously moves the second sliding housings 103. Also, within an interval between the second point to the third point, the disc 141b rotates due to the driving force of the elastic member 105 so that the first and second sliding housings 102 and 103 move.

At the third point, when the user moves at least one of the first and second sliding housings 102 and 103 in the direction where it is overlapped on the main housing 101, other sliding housings are moved by the disc 141b and first and second links 142 and 143 in the direction where they are overlapped on the main housing 101. When the selected sliding housing passes the second point where the both ends of the elastic member 105 approach each other to the maximum degree, elastic force of the elastic member 105 is converted to driving force to rotate the disc 141b in a counterclockwise direction. Within the interval between the second point and the first point, the first and second sliding housings 102 and 013 are slid due to the elastic force of the elastic member 105.

Although an example where the first sliding housing 102 slides in a longitudinal direction (in a vertical direction) of the main housing 101 is shown, a structure where the first sliding housing slides in a horizontal direction of the main housing (in a transverse direction) is possible.

Also, as the elastic member 105 mentioned as a component of the sliding module 104, a torsion spring coil having a coil with both free ends is shown. However, it is obvious to those skilled in the art that, elastic members can provide an elastic force allowing both free ends of the coil thereof to move away from each other.

Further, in the detailed description, although it is described that an approach point where both ends of the elastic member 105 approach each other to the maximum degree is a point where the disc 141b has rotated at 45 degrees based on the first point, it is understood by those skilled in the art that the approach point can be variously changed by adjusting each position where both ends of the elastic member 105 are supported. Because the movement range of the first sliding housing 102 is limited by the guide rib 149, the range where the supporting pin 153 formed on the disc 141b can move is limited. Therefore, the second point can be variously set according to the position of the supporting pin 151 formed on the fixed plate 141a.

In addition, a structure configured by the guide slots 129, guide rails 119, and guide grooves 137 is shown as a structure required for slidably installing the first and second sliding housings 102 and 103. Also, it is obvious to those skilled in the art that the structure can be modified by using other structures, for example, a guide structure including a guide rod, etc.

While the present invention has been shown and described with reference to an embodiment thereof, it will be understood by those skilled in the art that various changes in form and details may be made therein without departing from the spirit and scope of the invention.

What is claimed is:

1. A portable terminal comprising:
   a main housing;
   a first sliding housing slidably installed on the main housing in such a manner that the first sliding housing slides in a first direction;
   two second sliding housings slidably installed on the main housing in such a manner that the two second sliding housings slide in a second direction;
   a sliding module for providing driving force to move the first and two second sliding housings, the sliding module being installed on the main housing; and
   guide slots formed on a rear surface of the first sliding housing in such a manner that the guide slots extend along the first direction and guide ribs formed on one surface of a fixed plate, wherein a guide rib is assembled with a guide slot so as to allow the first sliding housing to be assembled with the main housing and to simultaneously guide a sliding of the first sliding housing,
   wherein the first sliding housing and two second sliding housings simultaneously move from positions where they overlap the main housing to positions where they extend from on the main housing.

2. The portable terminal as claimed in claim 1, wherein the second direction is perpendicular to the first direction.

3. The portable terminal as claimed in claim 1, wherein the two second sliding housings move on the main housing in such a manner that they approach or move away from each other, and when they move away from each other, they extend from opposite sides of the main housing.

4. The portable terminal as claimed in claim 1, wherein the sliding module includes a disc rotatably installed on the main housing, a first link having one end pivotably connected to the disc and another end pivotably connected to the first sliding housing, and two second links each having one end pivotably connected to the disc and another end pivotably connected with one of the two second sliding housings.

5. The portable terminal as claimed in claim 4, wherein the two second sliding housings are connected with the disc in such a manner that each sliding housing is connected with the disc through one of the second links.

6. The portable terminal as claimed in claim 4, wherein, as one of the first and second sliding housings slides, the disc is rotated by the first link or one of the two second links connected to the one of the first and second sliding housings, and remaining sliding housings slide according to the rotation of the disc.

7. The portable terminal as claimed in claim 4, wherein, as the first sliding housing slides, the disc is rotated by the first link connected to the first sliding housing, and the two second sliding housings approach or move away from each other according to the rotation of the disc.

8. The portable terminal as claimed in claim 4, wherein the sliding module further includes the fixed plate mounted on the main housing, and the disc is rotatably installed on the fixed plate.

9. The portable terminal as claimed in claim 8, wherein the sliding module includes an elastic member having one end supported by the disc and another end supported by the fixed plate, the elastic member provides an elastic force applied in a direction where both ends of the elastic member move away from each other, and a point where the both ends of the elastic member approach each other to a maximum degree is positioned between a point where the first and two second sliding housings overlap the main housing and a point where they extend from the main housing.

10. The portable terminal as claimed in claim 9, wherein the elastic member generates a driving force that allows the first and two second sliding housings to move to the point where they overlap the main housing, within an interval between the point where both ends of the elastic member approach each other to a maximum degree and the point where the first and two second sliding housings overlap the main housing, and also generates a driving force that allows the first and two second sliding housings to slide in a direction where they extend from the main housing, within an interval between the point where both ends of the elastic member approach each other to a maximum degree and the point where the first and second sliding housings have been extended from the main housing.

11. The portable terminal as claimed in claim 8, further comprising a reception recess formed on one surface of the main housing, wherein the reception recess is opened toward both sides of the main housing when the fixed plate is seated on the main housing.

12. The portable terminal as claimed in claim 11, wherein the two second sliding housings are seated in the reception recess, and the two sliding housings are inserted into or extended from opposite sides of the main housing through a sliding movement on the main housing.

13. The portable terminal as claimed in claim 11, further comprising guide rails formed on inner walls of upper and lower sides of the reception recess and guide grooves formed on both end walls of the second sliding housings, wherein a guide rail is engaged with a corresponding guide groove so as to allow the second sliding housings to be slidably assembled with the main housing and guide movement of the second sliding housings.

14. The portable terminal as claimed in claim 8, wherein a part of one surface of the fixed plate is exposed upon the sliding of the first sliding housing, and a first keypad is installed on the exposed part of the fixed plate.

15. The portable terminal as claimed in claim 14, further including two second keypads, one installed on each of the two second sliding housings, wherein, when the first and second sliding housings are extended from opposite sides of the main housing, a keypad having qwerty keypad arrangement is formed by the first keypad and the second keypads.

* * * * *